US009525705B2

(12) United States Patent
Violleau et al.

(10) Patent No.: US 9,525,705 B2
(45) Date of Patent: Dec. 20, 2016

(54) SYSTEM AND METHOD FOR MANAGING TOKENS AUTHORIZING ON-DEVICE OPERATIONS

(71) Applicant: Oracle International Corporation, Redwood Shores, CA (US)

(72) Inventors: Thierry Violleau, Conflans Sainte-Honorine (FR); Nicolas Ponsini, Mougins (FR); Patrick Van Haver, La Cadiere d'Azur (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 131 days.

(21) Appl. No.: 14/220,966

(22) Filed: Mar. 20, 2014

(65) Prior Publication Data

US 2015/0143484 A1 May 21, 2015

Related U.S. Application Data

(60) Provisional application No. 61/905,008, filed on Nov. 15, 2013.

(51) Int. Cl.
*G06F 7/04* (2006.01)
*H04L 29/06* (2006.01)
(Continued)

(52) U.S. Cl.
CPC ............. *H04L 63/20* (2013.01); *G06F 21/30* (2013.01); *G06F 21/305* (2013.01); *G06F 21/31* (2013.01); *H04L 63/0853* (2013.01)

(58) Field of Classification Search
CPC ...... H04L 63/20; H04L 63/0853; G06F 21/31; G06F 21/30; G06F 21/305
See application file for complete search history.

(56) References Cited

U.S. PATENT DOCUMENTS 4,599,489 A 7/1986 Cargile
4,609,777 A 9/1986 Cargile
(Continued)

FOREIGN PATENT DOCUMENTS

WO 2012055792 5/2012

OTHER PUBLICATIONS

European Patent Office, International Searching Authority, International Search Report and Written Opinion dated Dec. 23, 2014, 9 pages.
(Continued)

*Primary Examiner* — Krisna Lim
(74) *Attorney, Agent, or Firm* — Tucker Ellis LLP

(57) ABSTRACT

A system and method can support on-device operation management. A token issuer on a backend server, and/or a tool, can generate an authorization token, which is bound to a user of one or more devices using a unique identifier (ID) that is assigned to the user. The unique ID can be known and/or shared between the an on-device authorizing entity and the token issuer. Then, the on-device authorizing entity can verify the authorization token before granting an execution of one or more protected on-device operations. Furthermore, the on-device authorizing entity may not grant the execution of the one or more protected on-device operations, when the unique ID is erased from the device.

20 Claims, 5 Drawing Sheets

(51) Int. Cl.
*G06F 21/30* (2013.01)
*G06F 21/31* (2013.01)

(56) References Cited

U.S. PATENT DOCUMENTS

| | | | |
|---|---|---|---|
| 4,819,267 | A | 4/1989 | Cargile |
| 8,176,533 | B1* | 5/2012 | Violleau ............... H04L 63/083 340/5.81 |
| 8,307,210 | B1 | 11/2012 | Duane |
| 8,490,168 | B1* | 7/2013 | Holloway ........... H04L 63/0815 709/229 |
| 2007/0150942 | A1 | 6/2007 | Carmell |
| 2008/0127321 | A1 | 5/2008 | Vaeth |
| 2009/0198618 | A1* | 8/2009 | Chan ..................... G06Q 20/02 705/66 |
| 2009/0258631 | A1 | 10/2009 | Forsberg et al. |
| 2012/0031969 | A1 | 2/2012 | Hammad |
| 2012/0110646 | A1* | 5/2012 | Ajitomi ................. G06F 21/335 726/4 |

OTHER PUBLICATIONS

Menezes, Alfred, et al., "Handbook of Applied Cryptography, Chapter 12: Key Establishment Protocols", [CRC Press Series on Discrete Mathematices and Its Applications], CRC Press, Boca Raton, FL, US, pp. 489-541.

Meta data about auth token's User. (2013). Retrieved Sep. 30, 2103, from <http://developer.wordpress.com/docs/api/1/get/me/>, 3 pages.

Authenticating to OAuth2 Services. (2013). Retrieved Sep. 30, 2013, from <http://developer.android.com/training/id-auth/authenticate.html>, 5 pages.

Youn-Kyoung Park et al., "User Authentication Mechanism using Java Card for Personalized IPTV Services", International Conference on Convergence and Hybrid Information Technology 2008, pp. 618-626.

FortiToken Mobile-Software (OTP) for Mobile Devices. (2013). Retrieved Sep. 30, 2013, from <http://www.fortinet.com/products/fortitoken/mobile.html>, 2 pages.

Fortinet Technologies Inc., FortiToken Two Factor Authentication Solutions Guide, Nov. 16, 2012, 13 pages.

Authentication, mapping, and authorization with TFIM V6.2 and TAM. (2013). Retrieved Sep. 30, 2013 from, <http//publib.boulder.ibm.com/infocenter/wmbhelp/v7r0m0/index.jsp?topic=%2Fcom.ibm.etools.mft.doc%2Fbp28100__.html>, 5 pages.

Apple Inc., "Local and Push Notification Programming Guide", last modified Sep. 13, 2013. <https://developer.apple.com/library/ios/documentation/NetworkingInternet/Conceptual/RemoteNotificationsPG/RemoteNotificationsPG.pdf>, 59 pages.

Peng Kunyu et al., "An identify authentication system based on mobile phone token". Retrieved Sep. 30, 2013 from, <http://ieeexplore.ieee.org/xpl/articleDetails.jsp?tp=&arnumber=5360974&queryText%3Dauthorization+token+mobile>, 1 page.

* cited by examiner

SYSTEM AND METHOD FOR MANAGING TOKENS AUTHORIZING ON-DEVICE OPERATIONS

CLAIM OF PRIORITY

This application claims priority on U.S. Provisional Patent Application No. 61/905,008, entitled "SYSTEM AND METHOD FOR MANAGING TOKENS AUTHORIZING ON-DEVICE OPERATIONS" filed Nov. 15, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to device management.

BACKGROUND

In the post personal computer (PC) era, businesses often permit employees to bring various mobile devices, such as smart phones, tablets, and laptops, to their workplace. The employees can use those personally owned devices to access privileged company information and applications. The information technology industry has been evolving to promote the secure and interoperable deployment and management of software applications using secure chip technology, e.g. based on the Global Platform Specifications. This is the general area that embodiments of the invention are intended to address.

SUMMARY

Described herein are systems and methods that can support on-device operation management. A token issuer on a backend server, and/or a tool, can generate an authorization token, which is bound to a user of one or more devices using a unique identifier (ID) that is assigned to the user. The unique ID can be known and/or shared between the on-device authorizing entity and the token issuer. Then, the on-device authorizing entity can verify the authorization token before granting an execution of one or more protected on-device operations. Furthermore, the on-device authorizing entity may not grant the execution of the one or more protected on-device operations, when the unique ID is erased from the device.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Described herein are systems and methods that can support on-device operation management.

Exemplary Device Architecture

In accordance with an embodiment, the systems and methods described herein can be implemented as, or used with a device, such as a mobile device (e.g., smart phone), or other device In accordance with various embodiments, the device can be based on a system-on-chip (SoC) architecture. The description of embodiments of the invention provided herein generally uses the ARM SoC architecture as one example of a SoC architecture. It will be apparent to those skilled in the art that, in accordance with various embodiments, other types of SoC architecture can be used, without limitation.

In accordance with an embodiment, an SoC architecture, which includes both hardware and software components, can provide on-chip integration of various types of functional hardware, in order to perform different tasks such as power management, computing, audio/video, graphics, global positioning system (GPS), and radio.

The hardware components in a SoC architecture can include various analog, digital, and storage components. For example, in accordance with an embodiment, the analog components can include analog-to-digital converter (ADC) and digitally controlled amplifier (DCA) components, phase-locked loop (PLL) components, transmitting (Tx)/receiving (Rx) components, radio frequency (RF) components. The digital components can include various processors, interfaces, and accelerators. The storage components can include static random-access memory (SRAM), dynamic random-access memory (DRAM), non-volatile storage components such as flash memory, and read-only memory (ROM). Additionally, the SoC can contain programmable hardware, such as field-programmable gate array (FPGA), mixed signal blocks, and sensors.

In accordance with an embodiment, a SoC architecture can include both on-chip and off-chip software components. For example, the software components in a SoC architecture can include a real-time operation system (RTOS), device drivers, and software applications.

Additionally, in accordance with an embodiment, a SoC architecture can take advantage of various portable/reusable components and/or circuit designs, embedded CPU, embedded memory, and real world interfaces such as universal serial bus (USB), peripheral component Interconnect (PCI), and Ethernet.

Figure 1:
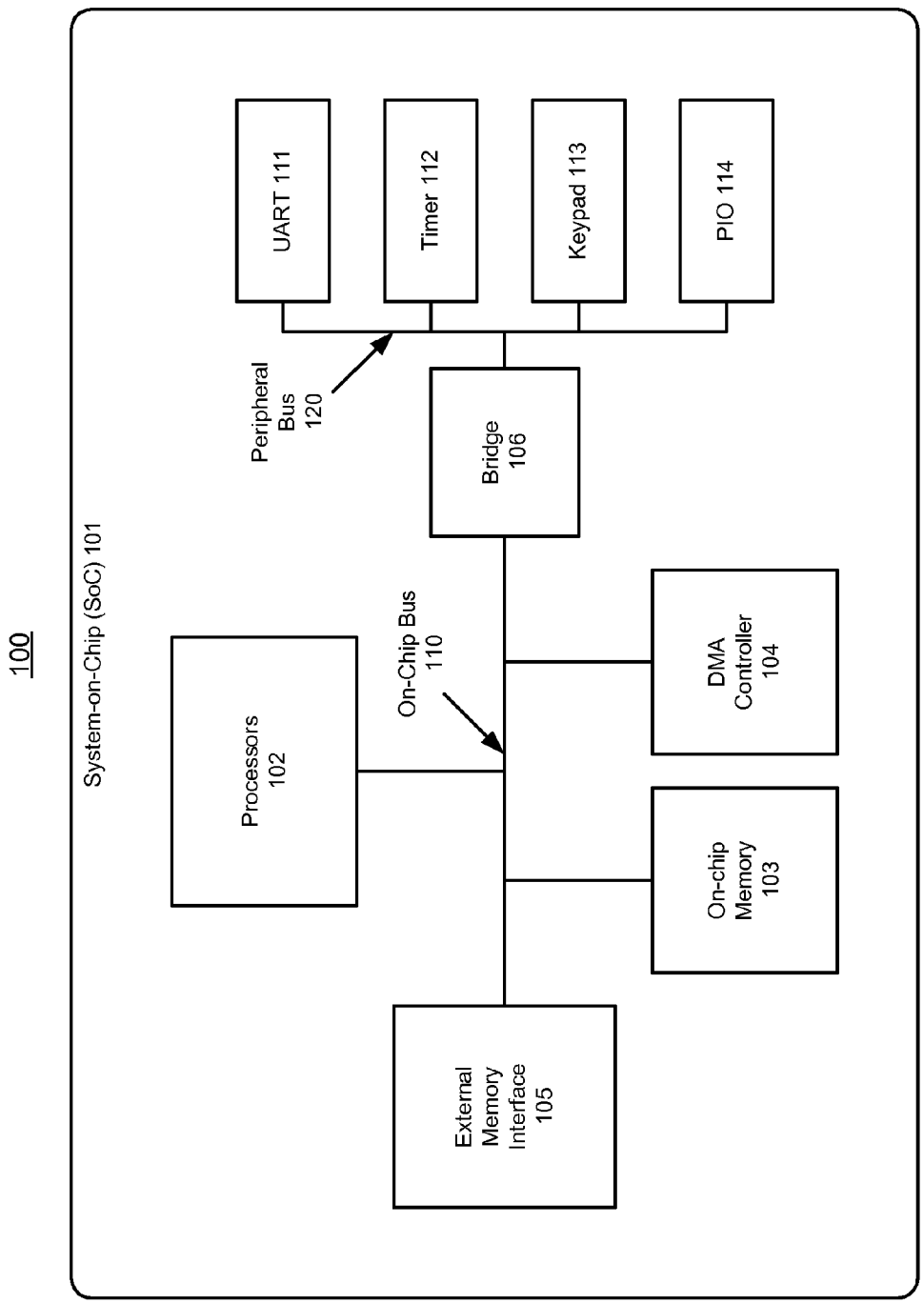
FIG. 1 shows an illustration of an exemplary system-on-chip (SoC) architecture on a device.

FIG. 1 shows an illustration of an exemplary system-on-chip (SoC) architecture on a device in accordance with an embodiment. As shown in FIG. 1, a SoC 101 for a device 100 can include a high performance on-chip bus 110, which interconnects one or more processors 102, an on-chip random-access memory (RAM) 103, a direct memory access (DMA) controller 104, and one or more external memory interfaces 105.

In accordance with an embodiment, the processors 102 in the SoC 101 can include a single-core or multiple-core central processing unit (CPU), a cache component, a graphics processing unit (GPU), a video codec, and a liquid-crystal display (LCD) video interface.

Also, in accordance with an embodiment, the SoC 101 can include a bridge 106 that connects the high performance on-chip bus 110 to a peripheral bus 120, which can be run with a lower bandwidth, using lower power, latched address and control, and simple interface. For example, as shown in FIG. 1, the peripheral bus 120 can provide access to a universal asynchronous receiver/transmitter (UART) 111, a timer 112, a keypad interface 113, and programmed input/output (PIO) interfaces 114.

In accordance with an embodiment, the SoC 101 for the device 100 can establish mobile connectivity using different technologies, such as Bluetooth, Wi-Fi, cellular (3G/4G/LTE/LTE-A) modem, and/or GPS.

The exemplary SoC architecture shown in FIG. 1 is provided for purposes of illustration. In accordance with various embodiments, other types of SoC architecture can be used.

Trusted Execution Environment (TEE)

Figure 2:
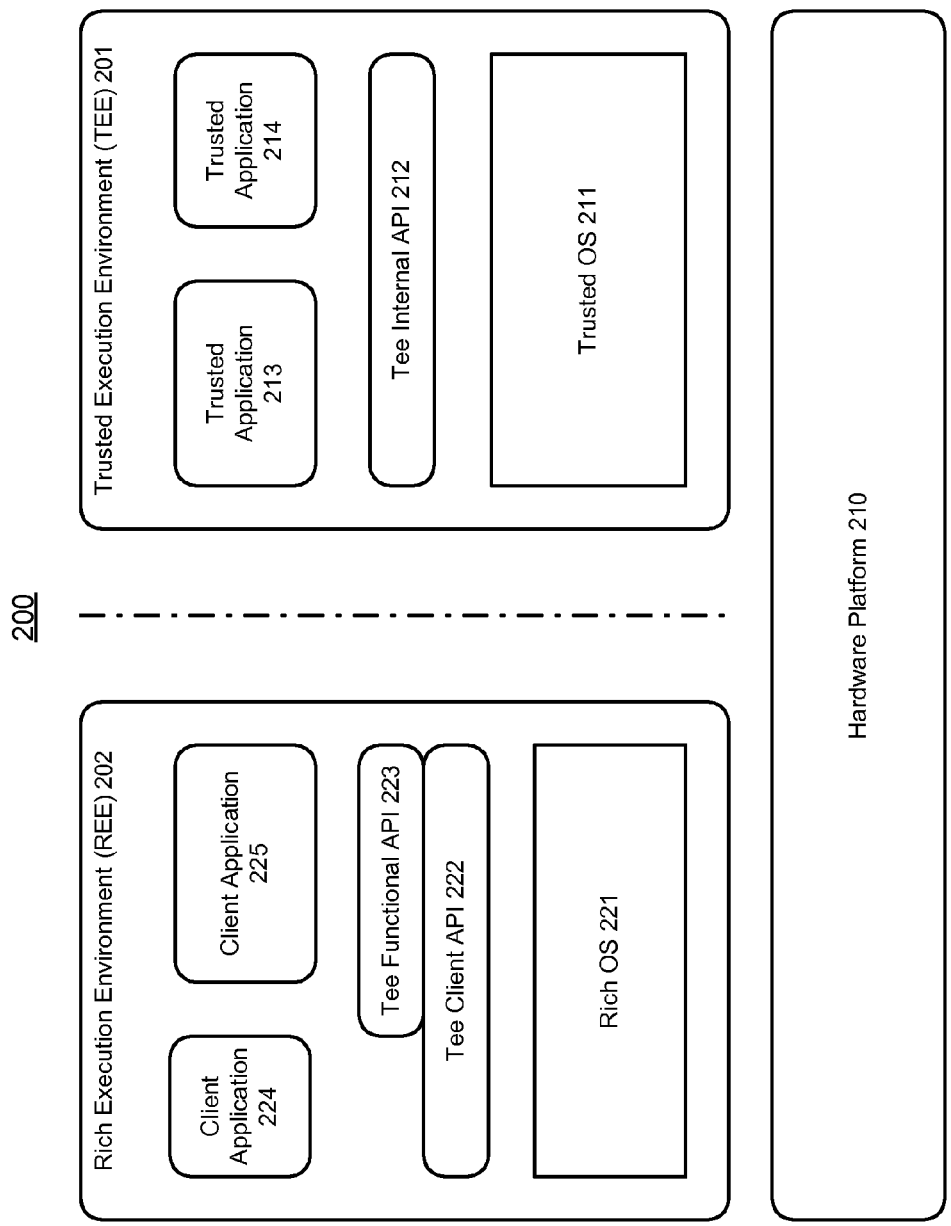
FIG. 2 shows an illustration of supporting a trusted execution environment (TEE) in a system-on-chip (SoC) architecture.

FIG. 2 shows an illustration of supporting a trusted execution environment (TEE) in a system-on-chip (SoC) architecture. As shown in FIG. 2, a SoC 200 architecture enables a device to execute code and to manipulate data in separate execution environments, e.g. a trusted execution environment (TEE) 201 and a rich execution environment (REE) 202.

The REE 202 can include the normal runtime environment based on a rich OS 221 (or the main OS such as Android or iOS), while the TEE 201, which is a secure area isolated from the REE 202, can include the secure runtime environment based on a secure OS (e.g. a trusted OS 211).

As shown in FIG. 2, both the TEE 201 and the REE 202 can run on top of a hardware platform 210. For example, an ARM SoC can provide a hardware mechanism based on the TrustZone technology and its related monitor code. Furthermore, the hardware mechanism 210 can enforce the isolation between the secure runtime environment in TEE 201 (i.e. "the secure world") and the normal runtime environment in REE 202 (i.e. "the normal world"). Also, the hardware mechanism 210 enables the communication between the two worlds.

Alternatively, both the TEE 201 and the REE 202 can be run on top of a hypervisor, instead of running directly on top of the hardware mechanism 210. For example, the hypervisor can host two virtual machines (VMs) with one VM dedicated to host the REE 202 and another VM dedicated to host the TEE 201. Here, in order to support the isolated secure execution, the VM that hosts the TEE 201 can be assigned with higher privileges over the VM that hosts the REE 202.

Furthermore, the SoC 200 can provide a root of trust that is bound to a secure boot mechanism (e.g. based on a boot ROM). The root of trust on a SoC 200 guarantees that the code in a TEE 201 is genuine and that only authorized code can be executed in the TEE 201.

As shown in FIG. 2, the TEE 201 environment allows one or more trusted application (TAs) 213-214 to run on top of the trusted OS 211, e.g. via a TEE internal application programming interface (API) 212. The trusted OS 211 can leverage the security features present on the SoC 200 and can execute the TAs 213-214 in the TEE 201 in a secure fashion.

The TAs 213-214 may need to be signed by an authority, such as an installation authority, before being installed within the TEE 201. Depending on business models and business agreements, the installation authority can be the owner of the device hosting the SoC 200, the OEM or a third party.

Once the TAs 213-214 are installed within the TEE 201, the TAs 213-214 can be stored in a secure file system (SFS), which is managed by the TEE 201. Furthermore, the TA 213-214 can be accessed from the SFS, each time when the TA 213-214 is required. Thus, the TEE 201 can provide secure storage for the TAs 213-214, since the SFS guarantees confidentiality and integrity of the data stored in it.

Also as shown in FIG. 2, the TEE 201 can expose a set of interfaces, such as the TEE client API 222 and the TEE functional API 223, in the REE 202, in order to provide security services to various client applications 224-225 in the REE 202. Additionally, the TEE 201 allows the client applications 224-225 in the REE 202 and the trusted applications 213-214 to use a shared memory for communicating large amounts of data, quickly and efficiently.

Authorization Token

Figure 3:
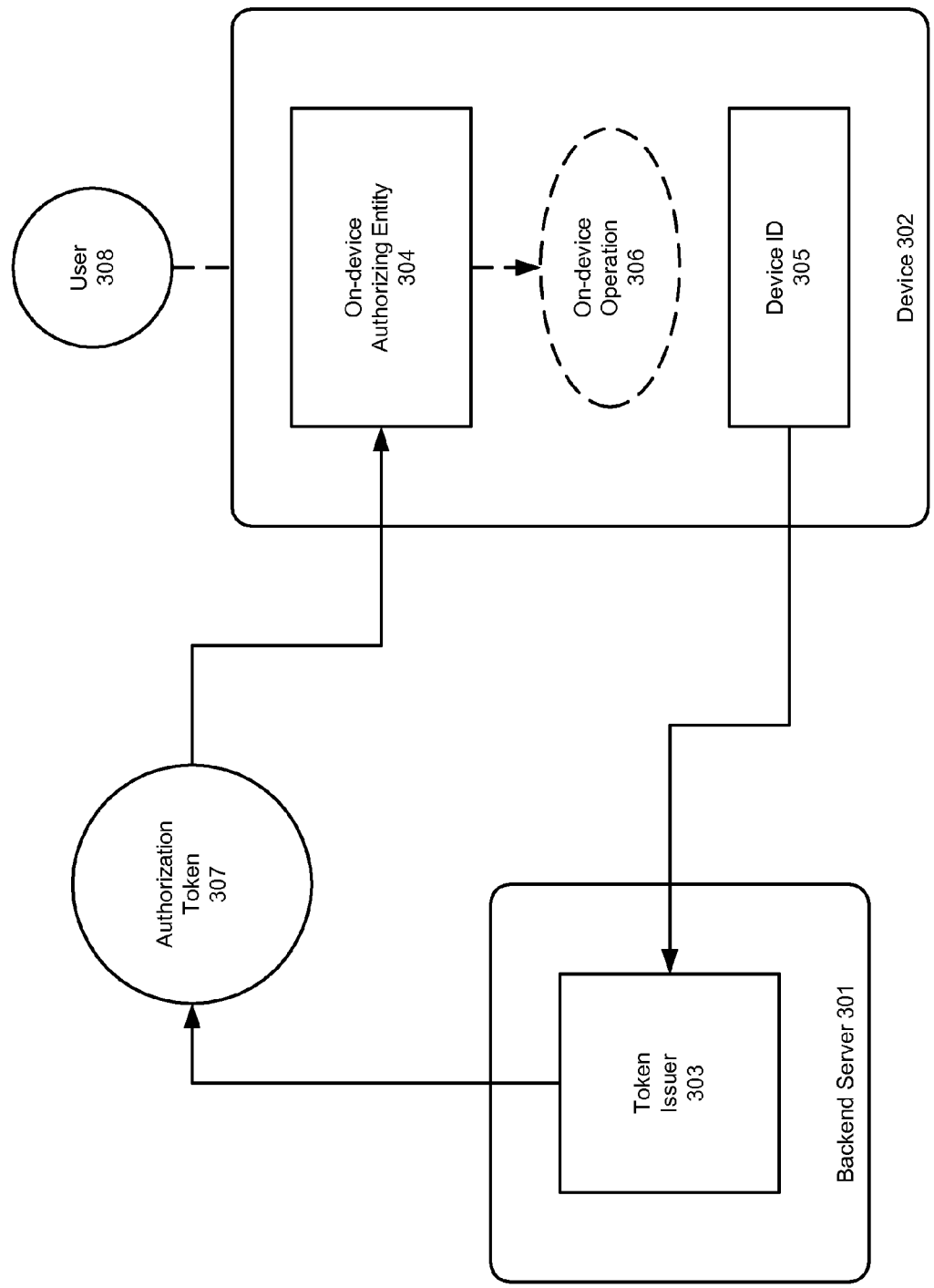
FIG. 3 shows an illustration of using an authorization token to support on-device operation management.

FIG. 3 shows an illustration of using an authorization token to support on-device operation management. As shown in FIG. 3, a token issuer 303 on a backend server 301 (and/or on a tool) can issue and sign one or more authorization tokens 307 that are bound to a particular device 302, which can be identified using a device ID 305. An on-device entity, such as an on-device authorizing entity 304, can verify the signature of the authorization tokens 307 before granting the execution of one or more protected on-device operations 306.

Since the authorization tokens 307 are bound to a device 302, instead of a user 308 of the device 302, the authorization tokens 307 may remain valid, even after the device 302 has already been passed (or sold) to another user, or after the device 302 has been refurbished.

The authorized on-device operations 306 are preferable to be bound to a user. For example, the authorized on-device operations 306 might have been paid and may not be transferable among the users. There may be security concerns, if the authorization tokens 307 remains valid after the device 302 change hands, since the authorization tokens 307 can be intercepted and stored for a replay.

Furthermore, various counter values can be used for addressing the security concerns that relate to using the authorization tokens 307. The system can compare a counter in an authorization token 307, which is immutable, to the counter in the on-device authorizing entity 304. The system may consider authorization token 307 is valid only if the counter in the authorization tokens 307 is greater that the counter in the on-device authorizing entity 304. Then, the system can update the counter in the on-device authorizing entity 304 with the value from the counter in the authorization tokens 307 to prevent the re-use of this authorization token.

Additionally, the authorization tokens 307 may need to be used in the same order as they are generated. For example, the reference counters maintained by the token issuer 303 may become out-of-synchronization, when a token 307 is pre-provisioned on a device 302 to be used at a later time.

Also, the above scheme does not allow for transferring the authorization tokens 307 from one device to another device, e.g. when the user 308 changes devices.

Binding Authorization Tokens to an On-Device Authorizing Entity

Figure 4:
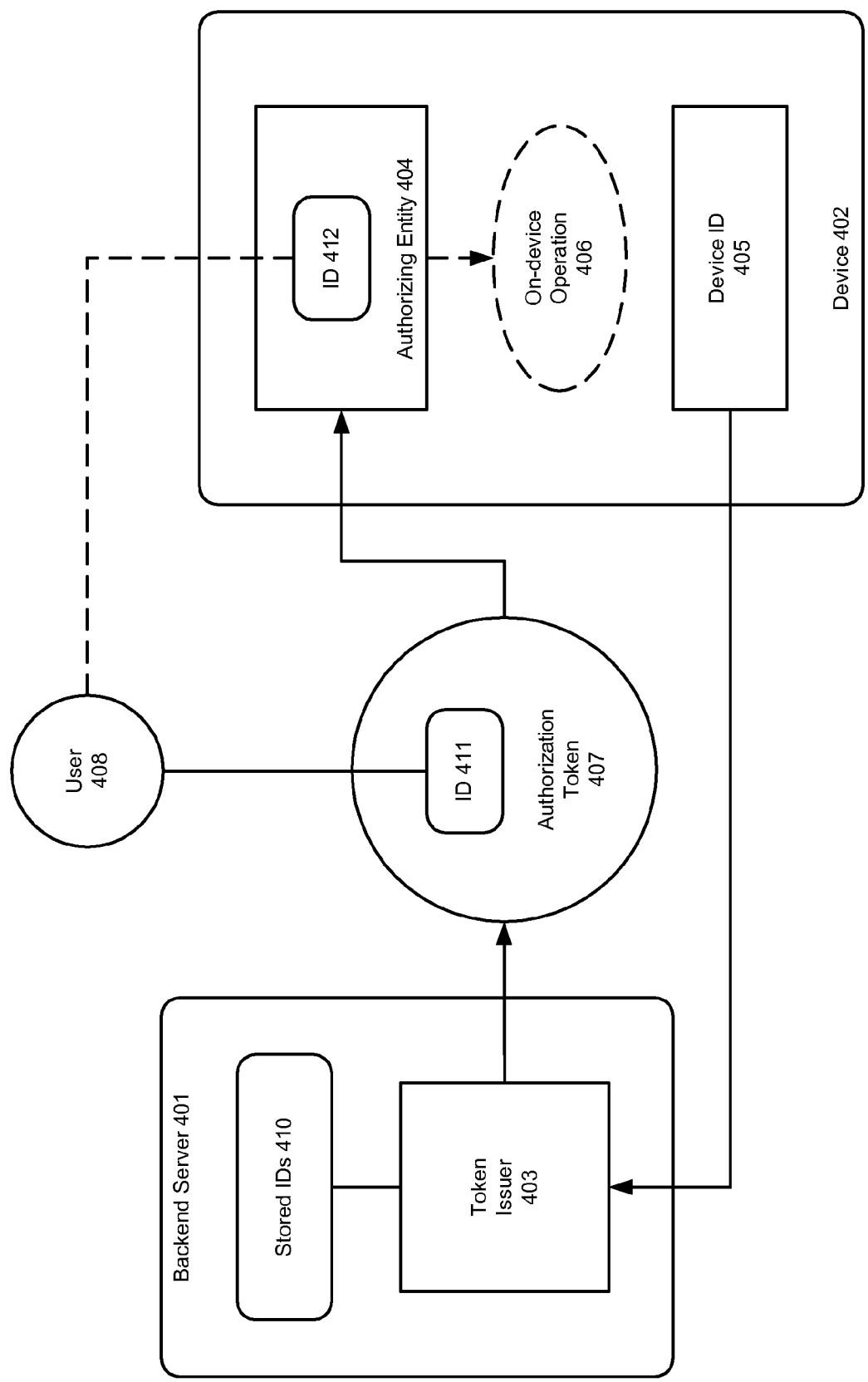
FIG. 4 shows an illustration of binding authorization tokens to an on-device authorizing entity, in accordance with an embodiment of the invention.

FIG. 4 shows an illustration of binding authorization tokens to an on-device authorizing entity, in accordance with an embodiment of the invention. As shown in FIG. 4, a token issuer 403 on a backend server 401 (and/or a tool) can issue and sign one or more authorization tokens 407 that are bound to a user 408 of one or more devices, e.g. a device 402, which can be identified using a device ID 405.

Additionally, the device 402 can be based on a system-on-chip (SoC) architecture. The SoC architecture enables the device 402 to execute code and to manipulate data in separate execution environments, e.g. a trusted execution environment (TEE).

In accordance with an embodiment of the invention, the system can support binding the authorization tokens 407 to the on-device authorizing entity 404 using a universally unique ID that is assigned to the user 408. One exemplary universally unique ID can be based on a random value (RV). Also as shown in FIG. 4, a unique ID can be shared between the token issuer 403 and the authorizing on-device entity 404 (i.e. as ID 411 and ID 412 respectively).

Furthermore, the on-device authorizing entity 404 can verify the authorization token 407 based on different criteria, such as verifying a signature of the authorization tokens 407, before granting the execution of one or more protected on-device operations 406.

Additionally, the verification of the authorization token 407 can include the verification of the validity of the binding, e.g. by comparing the unique ID 411 contained in the authorization token 407 with the unique ID 412 assigned to the on-device authorizing entity 402.

Thus, the system can determine that the binding is valid, when the unique ID 411 contained in the authorization token 407 matches the unique ID 412 assigned to the on-device authorizing entity 402. Otherwise, the system may determine that the binding is invalid, and the token issuer 403 may be able to reissue a different authorization token that contains a different unique ID (not shown), which matches the unique ID 412 assigned to the on-device authorizing entity 404.

In accordance with an embodiment of the invention, the system allows for the sharing of a unique ID (i.e. ID 411 and ID 412) between the token issuer 403 and an on-device authorizing entity 404. For example, the system can use a secure channel, which is established between the token issuer 403 and the on-device authorizing entity 404, for sharing different secrets including the unique ID 411 and 412.

Additionally, the token issuer 403 can store the generated unique IDs 410, which are assigned to different users, in the backend server 401. Thus, the system is able to easily transfer the authorization tokens 410 from one device to another device. For example, the token issuer can provision the unique ID 411, which is assigned to the user 408, to a new device, after the user 408 changes device or acquires an additional device.

In accordance with an embodiment of the invention, the unique ID 412 assigned to the on-device authorizing entity 404 may be erased after the device is refurbished. Also, the binding between the authorization tokens 407 and the on-device authorizing entity 404 may be broken as a result of the erasing of the unique ID 412. Thus, the authorization tokens 407 bound to the unique ID 412 may no longer be valid on the device 402, after the device is refurbished.

Furthermore, upon a refurbishment of the device 402, the on-device authorizing entity 404 may be recreated or re-initialized. The system can generate a new unique ID and subsequently shares the new unique ID between the token issuer 403 in the backend sever 401 and the newly created authorizing on-device entity 404 on the device 402.

Additionally, after a refurbishment of the device 402, the system can avoid the replay of the authorization tokens 407 that authorize the on-device operations 406. Also, the system allows for binding one or more authorization tokens to multiple devices of a single user, and can overcome de-synchronization issues related to the use of counters within the authorization tokens 407.

In accordance with an embodiment of the invention, the system can enable and support various use cases, which are base on the management of unique-IDs.

For example, the system supports the restoration of applications on a device after a reset by replaying the authorization tokens that is issued to the device, in which case the unique-ID is restored in the original device. Also, the system supports the restoration/transfer of applications from one device to a newly acquired device by replaying the authorization tokens 407 issued to the former device, in which case the unique-ID is copied to the new device. Additionally, the system can prevent the installation of applications by replaying the authorization tokens that are issued to a device after the device is refurbished, in which case a different unique-ID may have to be generated.

Furthermore, the system allows for sharing applications among several devices that belong to the same user with the same universally unique ID. Also, the system allows for sharing applications among a group of users (e.g. an enterprise or a family). Here, the different devices from the different users may be bound to the same ID that corresponds to the group, in addition to each of their own IDs. Subsequently, after a user leaves the group, the system can remove the ID corresponding to the group from the device of the user who left the group. Thus, the system can prevent any further unauthorized replay of the tokens that are issued to the group.

Additionally, the system supports the restoration of applications, which were previously installed on other devices, on to a new device. Here, the new device can be assigned with the unique IDs that were used in the former devices.

Figure 5:
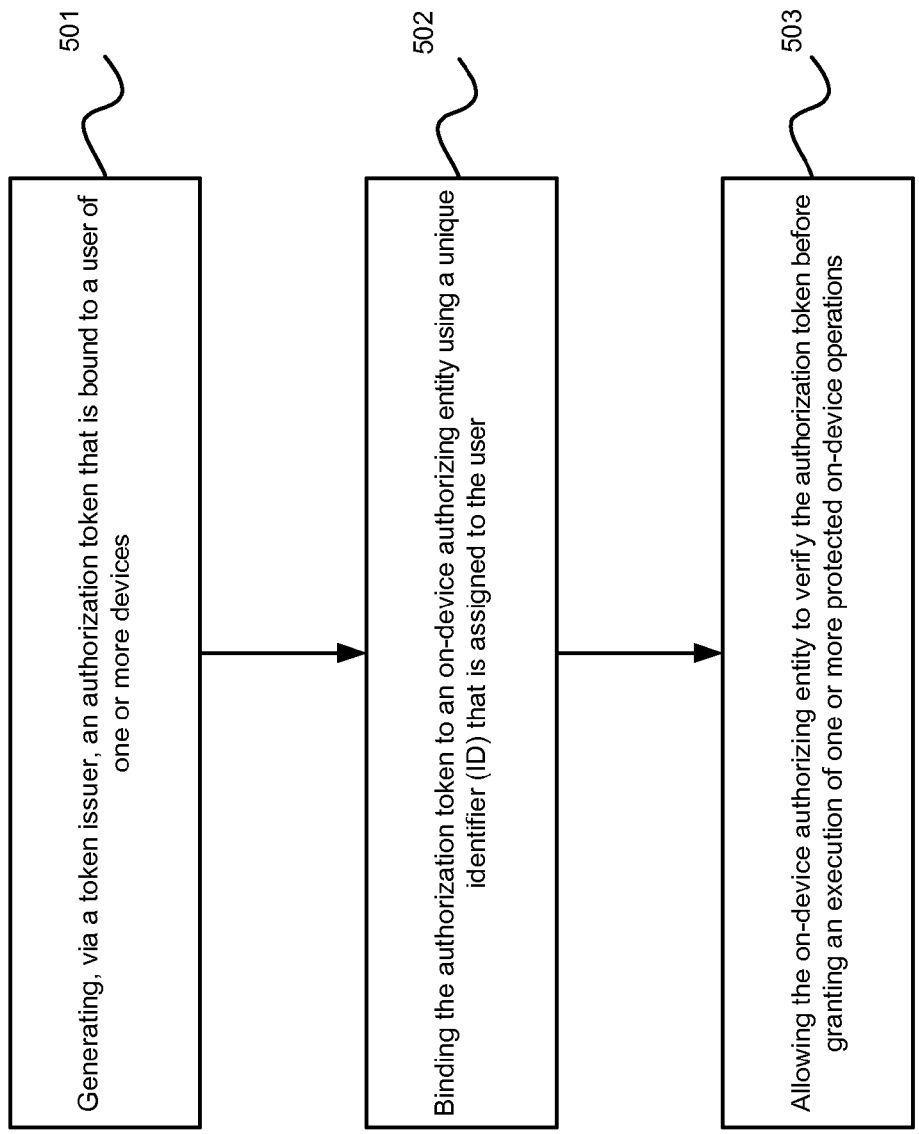
FIG. 5 illustrates an exemplary flow chart for managing tokens authorizing on-device operations, in accordance with an embodiment of the invention.

FIG. 5 illustrates an exemplary flow chart for managing tokens authorizing on-device operations, in accordance with an embodiment of the invention. As shown in FIG. 5, at step 501, a token issuer in a backend server can generate an authorization token that is bound to a user of one or more devices. Then, at step 502, the system can bind the authorization token to an on-device authorizing entity using a unique identifier (ID) that is assigned to the user. Furthermore, at step 503, the on-device authorizing entity can verify the authorization token before granting an execution of one or more protected on-device operations.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting on-device operation management, comprising:
providing an on-device authorizing entity on a device that includes one or more microprocessors, wherein the on-device authorizing entity stores a unique identifier assigned to a user of the device, wherein the unique identifier is shared with a token issuer that stores the unique identifier;
receiving, at the device, an authorization token generated by the token issuer, wherein the authorization token includes the unique identifier;
verifying, by the on-device authorizing entity, the authorization token by comparing the unique identifier contained in the authorization token with the unique identifier stored in the on-device authorizing entity, to determine whether to grant an execution of one or more protected operations on the device; and
wherein the token issuer operates to provision the unique identifier (ID) stored therein on the device after the device is reset, or on a new device, in response to a request by the user.

2. The method according to claim 1, further comprising:
generating a new unique ID when the on-device authorizing entity is recreated or re-initialized, and
communicating the new unique ID to a backend server that stores the new unique ID.

3. The method according to claim 1, further comprising:
storing, via the token issuer, one or more unique IDs that are assigned to different users.

4. The method according to claim 1, further comprising:
copying the unique ID from the device to one or more other devices that belong to the same user.

5. The method according to claim 1, further comprising:
preventing a replay of the authorization token, which authorizes one or more on-device operations, after a refurbishment of the device,
restoring one or more applications on the device after a reset by replaying the authorization token, or
restoring/transferring/copying one or more applications on a different device by replaying the authorization token.

6. The method according to claim 1, further comprising:
allowing applications on different devices to share the unique ID, and/or
allowing several dedicated unique IDs to be assigned to a single user.

7. The method according to claim 1, further comprising:
allowing a group of users to be associated with a separate unique ID, wherein the separate unique ID is assigned to the group instead of individual users in the group.

8. The method according to claim 7, further comprising:
allowing the group of users to share one or more applications over multiple devices.

9. A system for supporting device management, comprising:
one or more microprocessors;
a token issuer on a backend server, running on the one or more microprocessors, wherein the token issuer operates to
store a unique identifier assigned to a user of a device, wherein the device includes an on-device authorizing entity that shares the unique identifier stored therein with the token issuer,
generate an authorization token that includes the unique identifier, wherein the authorization token is received by the device, which invokes the on-device authorizing entity to verify the authorization token by comparing the unique identifier contained in the authorization token with the unique identifier stored in the on-device authorizing entity, to determine whether to grant an execution of one or more protected operations on the device, and provision the unique identifier (ID) stored therein on the device after the device is reset, or on a new device, in response to a request by the user.

10. The system according to claim 9, wherein the token issuer operates to generate a new unique ID when the on-device authorizing entity is recreated or re-initialized, wherein the new unique ID can be communicated to a backend server that stores the new unique ID.

11. The system according to claim 9, wherein the token issuer operates to store one or more unique IDs that are assigned to different users.

12. The system according to claim 9, wherein the token issuer operates to copy the unique ID from one device to one or more other devices that belongs to the same user.

13. The system according to claim 9, wherein the token issuer operates to prevent a replay of the authorization token, which authorizes one or more on-device operations, after a refurbishment of the device, restore one or more applications on the device after a reset by replaying the authorization token, or restore/transfer/copy one or more applications on a different device by replaying the authorization token.

14. The system according to claim 9, wherein the token issuer operates to allow applications on different devices to share the unique ID, and/or allow several dedicated unique IDs to be assigned to a single user.

15. The system according to claim 9, wherein the token issuer operates to allow a group of users, which share one or more applications over multiple devices, to be associated with a separate unique ID, wherein the separate unique ID is assigned to the group instead of individual users in the group.

16. A non-transitory machine readable storage medium having instructions stored thereon that when executed cause a system to perform the steps comprising:

providing an on-device authorizing entity on a device that includes one or more microprocessors, wherein the on-device authorizing entity stores a unique identifier assigned to a user of the device, wherein the unique identifier is shared with a token issuer that stores the unique identifier;

receiving, at the device, an authorization token generated by the token issuer, wherein the authorization token includes the unique identifier;

verifying, by the on-device authorizing entity, the authorization token by comparing the unique identifier contained in the authorization token with the unique identifier stored in the on-device authorizing entity, to determine whether to grant an execution of one or more protected operations on the device; and wherein the token issuer operates to provision the unique identifier (ID) stored therein on the device after the device is reset, or on a new device, in response to a request by the user.

17. The non-transitory machine readable storage medium to claim 16, wherein the token issuer operates to generate a new unique ID when the on-device authorizing entity is recreated or re-initialized, wherein the new unique ID can be communicated to a backend server that stores the new unique ID.

18. The non-transitory machine readable storage medium according to claim 16, wherein the token issuer operates to store one or more unique IDs that are assigned to different users.

19. The non-transitory machine readable storage medium according to claim 16, wherein the token issuer operates to copy the unique ID from the device to one or more other devices that belongs to the same user.

20. The non-transitory machine readable storage medium according to claim 16, wherein the token issuer operates to prevent a replay of the authorization token, which authorizes one or more on-device operations, after a refurbishment of the device, restore one or more applications on the device after a reset by replaying the authorization token, or restore/transfer/copy one or more applications on a different device by replaying the authorization token.

* * * * *

UNITED STATES PATENT AND TRADEMARK OFFICE
CERTIFICATE OF CORRECTION

PATENT NO.        : 9,525,705 B2
APPLICATION NO.   : 14/220966
DATED             : December 20, 2016
INVENTOR(S)       : Violleau et al.

It is certified that error appears in the above-identified patent and that said Letters Patent is hereby corrected as shown below:

On the Title Page

Item (57), Column 2, under Abstract, Line 6, delete "the an" and insert -- the --, therefor.

On page 2, Item (56), Column 1, under Other Publications, Line 3, delete "MATHEMATICES" and insert -- MATHEMATICS --, therefor.

On page 2, Item (56), Column 2, under Other Publications, Line 1, delete "2103," and insert -- 2013, --, therefor.

In the Specification

In Column 1, Line 39, delete "Global Platform" and insert -- GlobalPlatform --, therefor.

In Column 2, Line 24, after "device" insert -- . --.

In Column 6, Line 21, delete "base" and insert -- based --, therefor.

In the Claims

In Column 10, Line 21, in Claim 17, after "medium" insert -- according --.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*